United States Patent
Li et al.

(10) Patent No.: US 11,594,040 B2
(45) Date of Patent: Feb. 28, 2023

(54) MULTIPLE RESOLUTION DEEP NEURAL NETWORKS FOR VEHICLE AUTONOMOUS DRIVING SYSTEMS

(71) Applicants: Dalong Li, Troy, MI (US); Stephen Horton, Rochester, MI (US); Neil R Garbacik, Lake Orion, MI (US)

(72) Inventors: Dalong Li, Troy, MI (US); Stephen Horton, Rochester, MI (US); Neil R Garbacik, Lake Orion, MI (US)

(73) Assignee: FCA US LLC, Auburn Hills, MI (US)

( * ) Notice: Subject to any disclaimer, the term of this patent is extended or adjusted under 35 U.S.C. 154(b) by 279 days.

(21) Appl. No.: 16/985,460

(22) Filed: Aug. 5, 2020

(65) Prior Publication Data
US 2022/0044033 A1 Feb. 10, 2022

(51) Int. Cl.
| | |
|---|---|
| G06V 20/58 | (2022.01) |
| G06K 9/62 | (2022.01) |
| G06N 3/08 | (2006.01) |
| G06N 20/20 | (2019.01) |
| G06T 7/00 | (2017.01) |
| G06T 7/20 | (2017.01) |
| G01S 17/89 | (2020.01) |
| G06N 3/04 | (2006.01) |

(52) U.S. Cl.
CPC .............. G06V 20/58 (2022.01); G01S 17/89 (2013.01); G06K 9/6201 (2013.01); G06K 9/6218 (2013.01); G06N 3/0454 (2013.01); G06N 3/08 (2013.01); G06N 20/20 (2019.01); G06T 7/0002 (2013.01); G06T 7/20 (2013.01); G06T 2207/30261 (2013.01)

(58) Field of Classification Search
None
See application file for complete search history.

(56) References Cited

U.S. PATENT DOCUMENTS

| | | | |
|---|---|---|---|
| 10,108,850 B1 * | 10/2018 | Das | G06V 10/82 |
| 10,719,301 B1 * | 7/2020 | Dasgupta | G06F 11/3688 |
| 2016/0307096 A1 * | 10/2016 | Goel | G06N 20/00 |
| 2019/0235515 A1 * | 8/2019 | Shirvani | G06N 3/08 |
| 2019/0258251 A1 * | 8/2019 | Ditty | G06V 20/58 |

(Continued)

FOREIGN PATENT DOCUMENTS

| | | | | |
|---|---|---|---|---|
| WO | 2018184204 A1 | 10/2018 | | |
| WO | WO-2021087129 A1 * | 5/2021 | .......... | G06N 3/0454 |
| WO | WO-2022064209 A2 * | 3/2022 | ............. | G06N 3/086 |

*Primary Examiner* — Delomia L Gilliard
(74) *Attorney, Agent, or Firm* — Ralph E. Smith

(57) ABSTRACT

Techniques for training multiple resolution deep neural networks (DNNs) for vehicle autonomous driving comprise obtaining a training dataset for training a plurality of DNNs for an autonomous driving feature of the vehicle, sub-sampling the training dataset to obtain a plurality of training datasets comprising the training dataset and one or more sub-sampled datasets each having a different resolution than a remainder of the plurality of training datasets, training the plurality of DNNs using the plurality of training datasets, respectively, determining a plurality of outputs for the autonomous driving feature using the plurality of trained DNNs and the input data, receiving input data for the autonomous driving feature captured by a sensor device, and determining a best output for the autonomous driving feature using the plurality of outputs.

18 Claims, 3 Drawing Sheets

(56) References Cited

U.S. PATENT DOCUMENTS

| | | | |
|---|---|---|---|
| 2019/0370665 A1* | 12/2019 | David | G06N 3/086 |
| 2020/0026965 A1* | 1/2020 | Guo | G06V 20/00 |
| 2020/0202167 A1* | 6/2020 | Gross | G06K 9/6227 |
| 2020/0320807 A1* | 10/2020 | Gorti | B60W 60/001 |
| 2021/0117802 A1* | 4/2021 | Nguyen | G06N 3/082 |

* cited by examiner

MULTIPLE RESOLUTION DEEP NEURAL NETWORKS FOR VEHICLE AUTONOMOUS DRIVING SYSTEMS

FIELD

The present application generally relates to autonomous driving features and, more particularly, to multiple resolution deep neural networks (DNNs) for vehicle autonomous driving systems.

BACKGROUND

Some vehicles are equipped with an advanced driver assistance (ADAS) or autonomous driving system that are configured to perform one or more assistance or autonomous driving features (adaptive cruise control, lane centering, collision avoidance, etc.). Many of these features utilize deep neural networks (DNNs) and various input data (camera images, light detection and ranging (LIDAR) point cloud data, etc.) to generate determinative outputs, such as object detection and tracking. Conventional systems typically utilize a single DNN trained with a single training dataset. The trained DNN, however, could still potentially suffer from a desired level of accuracy and robustness. The same trained DNN could also be run in separate instances and then the outputs are compared, but this still may not produce the desired levels of accuracy and robustness, particular for ADAS and autonomous applications. Accordingly, while these conventional systems do work well for their intended purpose, there exists an opportunity for improvement in the relevant art.

SUMMARY

According to one example aspect of the invention, an autonomous driving system for a vehicle is presented. In one exemplary implementation, the autonomous driving system comprises: a sensor device configured to capture input data for an autonomous driving feature, and a control system configured to: obtain a training dataset for training a plurality of deep neural networks (DNNs) for the autonomous driving feature, sub-sample the training dataset to obtain a plurality of training datasets comprising the training dataset and one or more sub-sampled training datasets each having a different resolution than a remainder of the plurality of training datasets, train the plurality of DNNs using the plurality of training datasets, respectively, determine, using the plurality of trained DNNs and the input data, a plurality of outputs for the autonomous driving feature, and determine, using the plurality of outputs, a best output for the autonomous driving feature.

In some implementations, the control system is configured to sub-sample the training dataset using sequential leader clustering. In some implementations, the sequential lead clustering comprises, for each sub-sampled training dataset: determining a different clustering threshold value, for each sample of the training dataset, determining a distance between the sample and remainder of the samples of the training dataset, removing any of the plurality of samples of the training dataset that have a distance less than the clustering threshold value indicative of a match with another particular sample of the training dataset to generate the sub-sampled training dataset.

In some implementations, the control system is configured to train the plurality of DNNs using a different dropout rate for each of the plurality of DNNs. In some implementations, the control system is configured to determine the best output for the autonomous driving feature using a voting scheme. In some implementations, the control system is further configured to: determine a degradation state when the plurality of outputs continue to not differ by more than a threshold for a period of time, and in response to determining the degradation state, at least one of set a fault and adjust or limit operation of the autonomous driving feature.

In some implementations, the plurality of trained DNNs are all executable by a single processing device or system. In some implementations, the autonomous driving feature is object detection and tracking. In some implementations, the sensor device is a camera system configured to capture images of an area external to the vehicle. In some implementations, the sensor device is a light detection and ranging (LIDAR) system configured to capture LIDAR point cloud data for an area external to the vehicle.

According to another example aspect of the invention, a method for training multiple resolution DNNs for vehicle autonomous driving is presented. In one exemplary implementation, the method comprises: obtaining, by a control system, a training dataset for training a plurality of DNNs for an autonomous driving feature of the vehicle, sub-sampling, by the control system, the training dataset to obtain a plurality of training datasets comprising the training dataset and one or more sub-sampled datasets each having a different resolution than a remainder of the plurality of training datasets, training, by the control system, the plurality of DNNs using the plurality of training datasets, respectively, determining, by the control system, a plurality of outputs for the autonomous driving feature using the plurality of trained DNNs and the input data, receiving, by the control system, input data for the autonomous driving feature captured by a sensor device, and determining, by the control system, a best output for the autonomous driving feature using the plurality of outputs.

In some implementations, the sub-sampling of the training dataset comprises using sequential leader clustering. In some implementations, the sequential lead clustering comprises, for each sub-sampled training dataset: determining, by the control system, a different clustering threshold value, for each sample of the training dataset, determining, by the control system, a distance between the sample and remainder of the samples of the training dataset, and removing, by the control system, any of the plurality of samples of the training dataset that have a distance less than the clustering threshold value indicative of a match with another particular sample of the training dataset to generate the sub-sampled training dataset.

In some implementations, training the plurality of DNNs comprises using a different dropout rate for each of the plurality of DNNs. In some implementations, the determining of the best output for the autonomous driving feature comprises using a voting scheme. In some implementations, the method further comprises: determining, by the control system, a degradation state when the plurality of outputs continue to not differ by more than a threshold for a period of time, and in response to determining the degradation state, at least one of, by the control system, setting a fault and adjusting or limiting operation of the autonomous driving feature.

In some implementations, the plurality of trained DNNs are all executable by a single processing device or system. In some implementations, the autonomous driving feature is object detection and tracking. In some implementations, the sensor device is a camera system configured to capture images of an area external to the vehicle. In some implementations, the sensor device is a LIDAR system configured to capture LIDAR point cloud data for an area external to the vehicle.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As discussed above, there exists an opportunity for improvement in the art of advanced driver assistance (ADAS) and autonomous driving systems and, in particular, in the art of deep neural network (DNN) training and usage. Accordingly, ADAS and autonomous driving systems and methods having more accurate and robust outputs are presented. For simplicity, the term "autonomous" will hereinafter be used, but it will be appreciated that this encompasses both fully-autonomous (L3, L4, etc.) and semi-autonomous (e.g., ADAS) features (adaptive cruise control, lane centering, collision avoidance, etc.). The techniques of the present disclosure generate a plurality of training datasets having different resolutions from a single training dataset. This is achieved, for example, using sub-sampling, such as sequential leader clustering. The plurality of training datasets are then used to train a plurality of DNNs, respectively. The result is multiple resolution DNNs, which can be concurrently run and their collective outputs used (e.g., in a voting scheme) to determine a best output. This is more accurate and robust compared to using a single resolution DNN, particular for noisy training data as the sub-sampled versions will produce smoother training data and trained DNNs that are less susceptible to noise. In addition, a single conventional processor (a graphical processing unit (GPU), a central processing unit (CPU) with multiple cores, etc.) is capable of simultaneously running multiple DNNs, and this no additional hardware is required.

Figure 1:
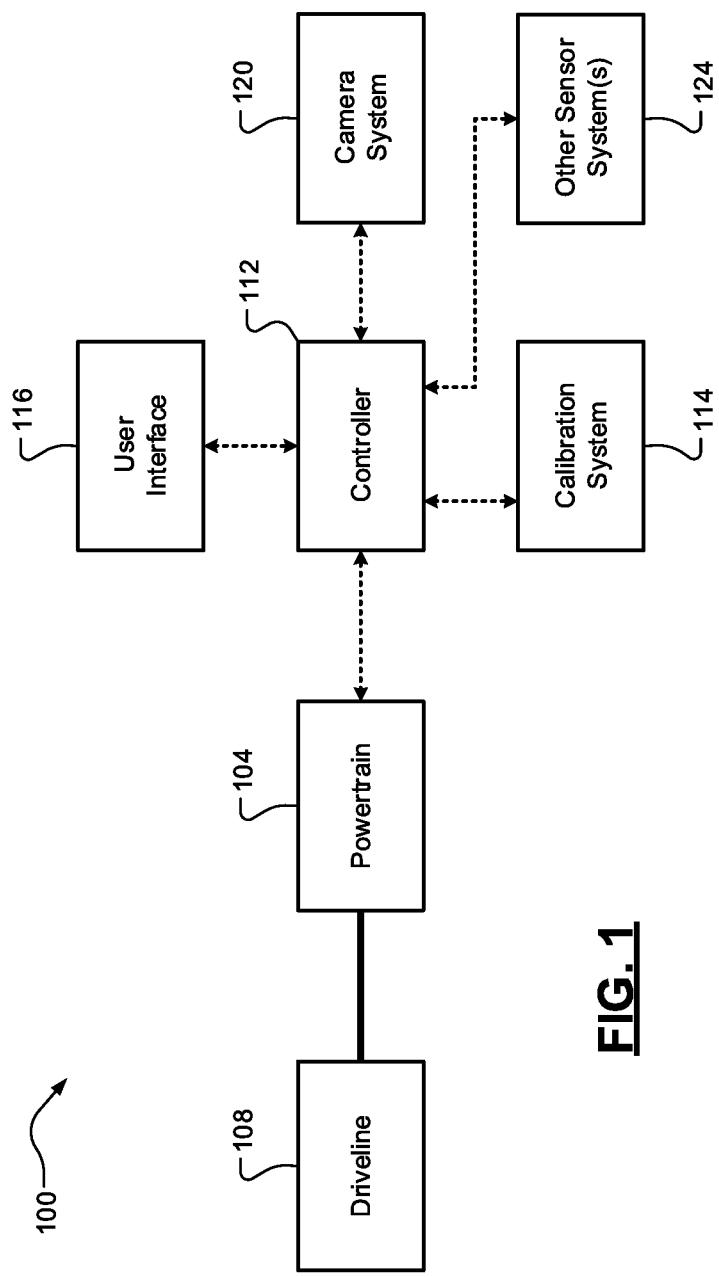
FIG. 1 is a functional block diagram of an example vehicle having an autonomous driving system according to the principles of the present disclosure.

Referring now to FIG. 1, a functional block diagram of an example vehicle 100 having an autonomous driving system according to the principles of the present disclosure. The vehicle 100 comprises a powertrain (an engine, an electric motor, combinations thereof, etc.) that generates drive torque. The drive torque is transferred to a driveline 108 of the vehicle 100 for propulsion of the vehicle 100. A controller 112 controls operation of the powertrain 108 to achieve a desired amount of drive torque, e.g., based a driver torque request provided via a user interface 116 (e.g., an accelerator pedal). The controller 112 also implements autonomous driving features. The autonomous driving system of the present disclosure therefore generally comprises the controller 112, a camera system 120, and one or more other sensor systems 124, but it will be appreciated that the autonomous driving system could include other non-illustrated components (a steering actuator, a brake system, etc.) for implementing specific autonomous driving features (adaptive cruise control, lane centering, collision avoidance, etc.). An external or separate calibration system 114 could also be implemented to perform at least a portion of the techniques of the present disclosure offline, such as generating the plurality of training datasets and training the plurality of trained DNNs accordingly. The trained DNNs could then be loaded into the controller 112 and utilized online. The controller 112 and the calibration system 114 will therefore be referred to collectively as a "control system."

The camera system 120 is any suitable camera or system of multiple cameras that is/are configured to capture image frames of a scene outside of the vehicle 100. In one exemplary implementation, the camera system 120 is an external front-facing camera system (e.g., for capturing image frames of a scene in front of and at least partially on the sides of the vehicle 100). When the camera system 120 is an external or exterior camera system, a lens of the camera system 120 is exposed to the environment outside of the vehicle 100. In this regard, the lens of the camera system 120 could be exposed to fog/moisture/dust or other things that could cause it to capture poor quality image frames. As previously discussed, the camera system 120 could also be susceptible to shaking or jarring due to uneven road conditions. In one exemplary implementation, the one or more other sensor systems 124 comprise a LIDAR system that is configured to emit light pulses that are reflected off of objects and recaptured by the LIDAR system to generate LIDAR point cloud data, but it will be appreciated that the one or more other sensor systems 124 could comprise other sensors or sensor systems (e.g., radio detection and ranging, or RADAR) or other object proximity sensing system. For purposes of this disclosure, the input data to the multiple resolution DNNs can be any suitable input data (camera images, LIDAR point cloud data, etc.). Thus, these devices 120, 124 are also referred to generally as a "sensor device" or "input device."

Figure 2A:
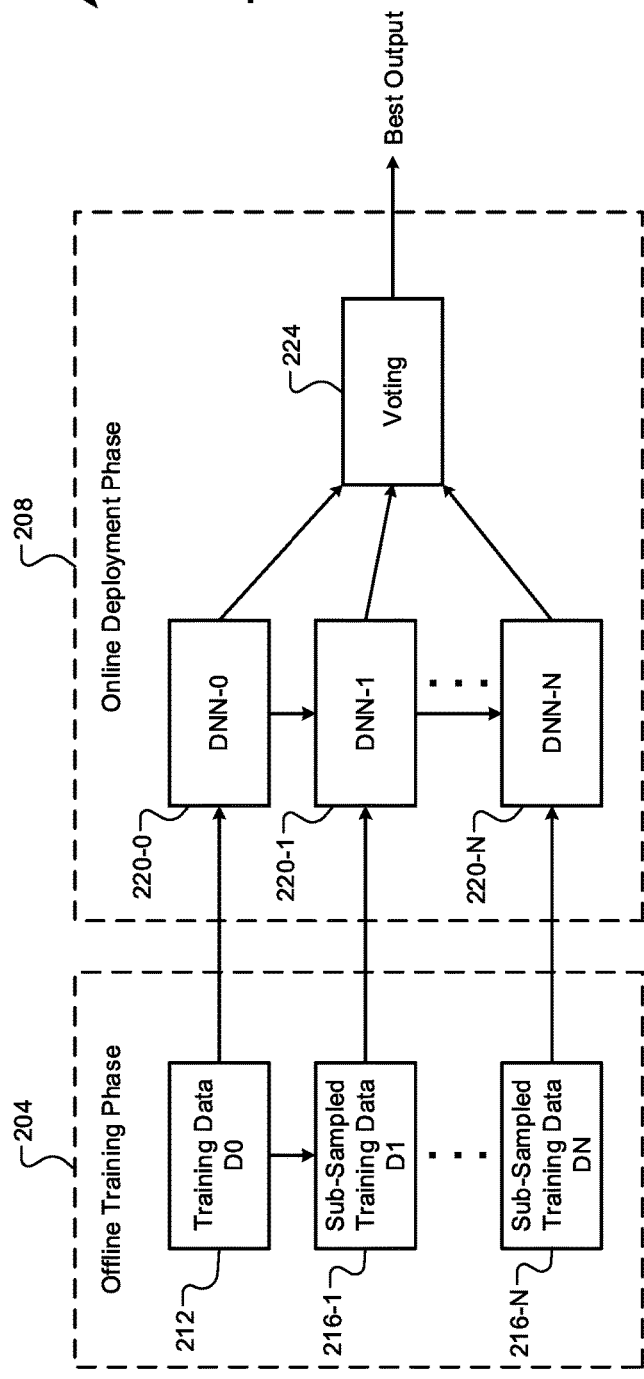
FIGS. 2A-2B are functional block diagrams of example deep neural network (DNN) training and voting architectures according to the principles of the present disclosure.

Referring now to FIG. 2A, an example multiple resolution DNN training and voting architecture 200 is illustrated. This architecture 200 is generally divided into two phases: an offline training phase 204 and an online deployment phase 208. As previously mentioned, at least a portion of the training set determination and DNN training could be performed by the calibration system 114 (offline) and then loaded into the controller 112 (online). From an initial or base training data 212, at least one sub-sampled training data 216-1 . . . 216-N (collectively "sub-sampled training dataset(s) 216," where N is an integer greater than or equal to one) is obtained. Each sub-sampled training dataset 216 should have a different resolution than the training dataset 212 and a remainder of other sub-sampled training datasets 216, if any. This can be achieved, for example, using sequential leader clustering. This involves, for each sub-sampled training dataset 216: (1) selecting a different clustering threshold (T), (2) initializing a codebook ® by randomly selecting a sample from the training dataset (Ω), (3) for each sample $(x_i)$ in Ω, compute the distance $(d_{ij})$ between $x_i$ and every sample $x_j$ in R, (4) compute the minimum distance of $d_{ij}$, the distance between $x_i$ and the closest sample in R, (5) if the minimum distance is smaller than T, this sample is matched with one of the samples in the codebook R and thus it is not added to the codebook; otherwise, if the minimum distance is larger than T, meaning there is no match, the sample is a new cluster and it is added into the codebook R. When all samples are processed in (3)-(5), the sequential leader clustering finishes and the codebook R is the final codebook (i.e., the sub-sampled training dataset). This effectively removes any sample that is matched with one of the samples in the codebook (i.e., close enough to one of the samples in the codebook). Thus, the density of the samples in the reduced set is effectively smaller than that of the original dataset. In this sense, the sequential leader clustering algorithm effectively sub-samples the dataset.

The training dataset 212 and the sub-sampled training dataset(s) 216 collectively form a plurality of training datasets that are utilized to train a plurality of DNNs, respectively, comprising DNNs 220-0 . . . 220-N (collectively, "plurality of DNNs 220," where again N is an integer greater than or equal to one). By training the plurality of DNNs 220 each with a different resolution training set, multiple resolution DNNs are obtained. In addition to reducing the size of the training datasets 216, each of the plurality of DNNs 220 can also adjust their dropout rate. For example only, the dropout rate for DNN-0 220-0 could be 0.2, the dropout rate for DNN 220-1 could be 0.4, and the dropout rate for DNN-N 220-N (e.g., for N=3) could be 0.6. In one exemplary implementation, the dropout rate should not exceed 0.8, as a dropout rate of 1 or close to 1 would mean all samples are discarded. In other words, the higher the dropout rate, the more connections are removed, and the model is smaller. The plurality of DNNs 220 are then utilized with input data (camera images, LIDAR, etc.) to generate a plurality of outputs for an autonomous driving feature (e.g., object detection and tracking). The plurality of outputs could be collectively utilized by a voting scheme 224, which could determine a best output based on the plurality of outputs. This could be any suitable best output determination, such as selecting the most likely occurring output, an average of the outputs, or some combination thereof. The best output (e.g., "object detected") could then be utilized by the autonomous driving feature, which could further cause other remedial action (e.g., collision avoidance).

Figure 2B:
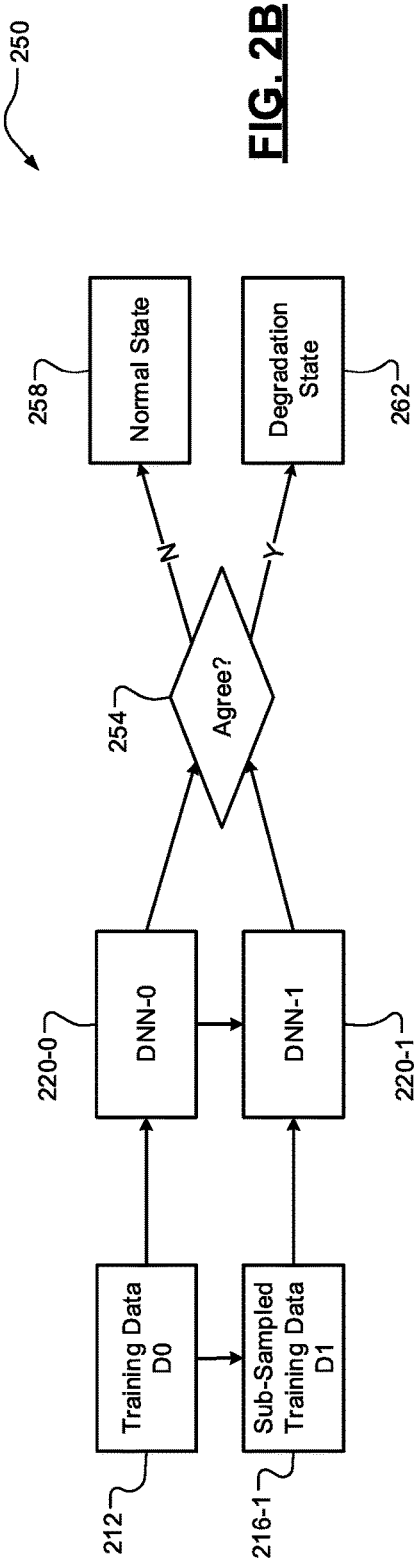

Referring now to FIG. 2B, another example multiple resolution DNN training and voting architecture 250 is illustrated. This architecture 250 can also be described as a degradation determination architecture. While only two training datasets 212, 216-1 and two different resolution trained DNNs 220-0 and 220-1 (collectively, "the plurality of DNNs 220") are illustrated, it will be appreciated that this architecture 250 could be extended to other quantities. After training, the plurality of DNNs 220, the plurality of DNNs 220 are utilized with input data (camera images, LIDAR, etc.) to generate a plurality of outputs for an autonomous driving feature (e.g., object detection and tracking). The plurality of outputs are compared by comparator 254 to see if there is an agreement (e.g., a difference of less than a calibratable threshold). This threshold could be relatively small, since the DNN outputs are expected to be different but not wholly dissimilar. When there is no agreement, the normal state 258 is determined and the autonomous driving feature is allowed to continue as normal. However, when there is an agreement, which is not expected with different resolution DNNs, a degradation state 262 is determined and the autonomous driving feature operation is modified. This could include, adjustments and/requesting or forcing driver intervention, such as requiring the driver to take control of a steering wheel (e.g., fully-disabling the autonomous driving feature). This could also be monitored over a period of time (i.e., not just for a single pair or group of outputs). If this continues to be observed for the period of time, then the degradation state 262 could be determined.

Figure 3:
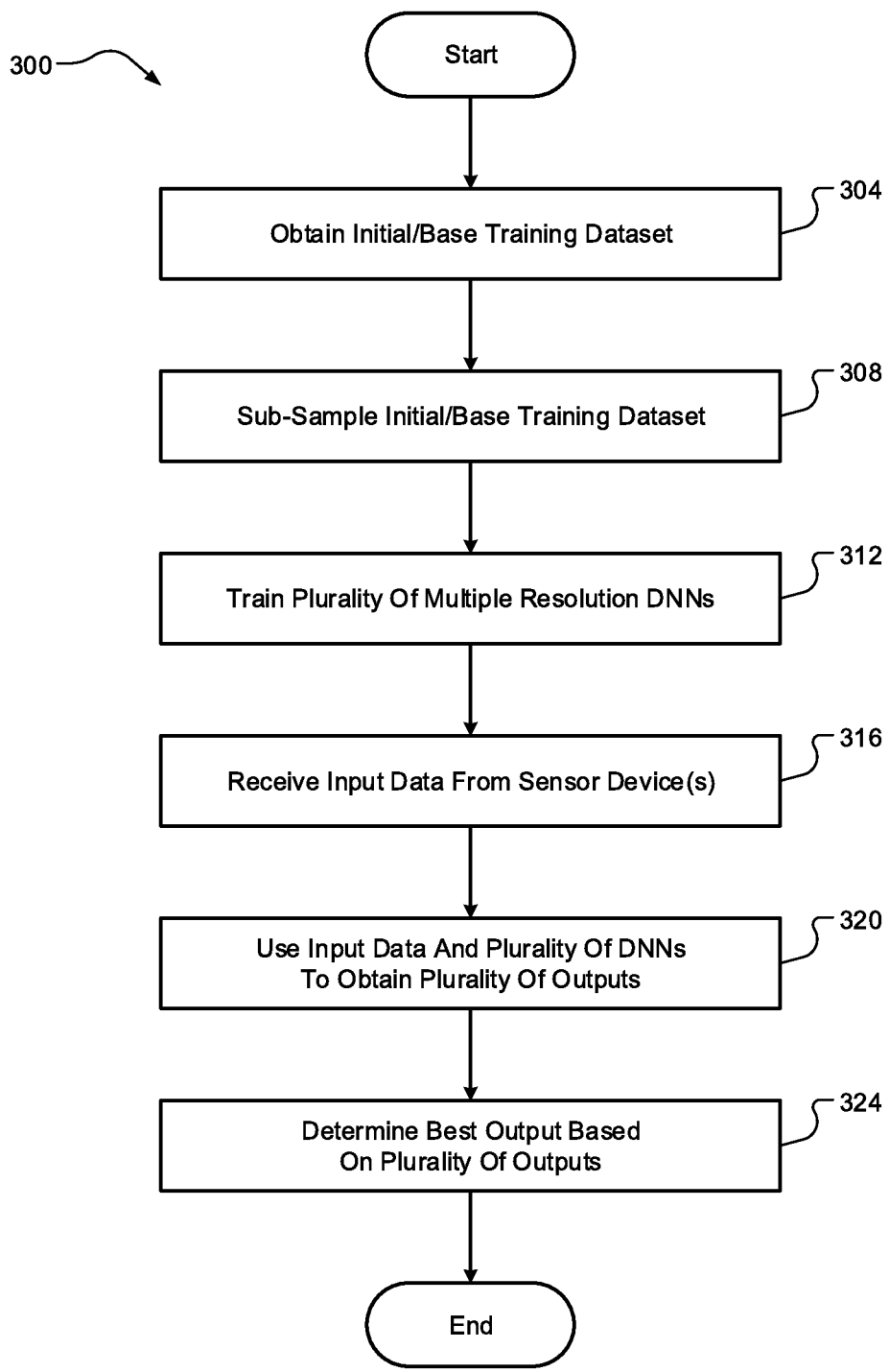
FIG. 3 is a flow diagram of an example multiple resolution DNN training method for vehicle autonomous driving according to the principles of the present disclosure.

Referring now to FIG. 3, a flow diagram of an example multiple resolution DNN training method 300 for vehicle autonomous driving according to the principles of the present disclosure is illustrated. As previously discussed, at least some portions of the techniques can be implemented offline (e.g., by the calibration system 114) whereas other portions can be implemented online (e.g., by the controller 112) and thus the method 300 will be described generally as being performed by the control system. At 304, the control system obtains a training dataset for training a plurality of DNNs for an autonomous driving feature of the vehicle 100 (e.g., object detection and tracking). At 308, the control system sub-samples the training dataset (e.g., using sequential leader clustering) to obtain a plurality of training datasets comprising the training dataset and one or more sub-sampled datasets each having a different resolution than a remainder of the plurality of training datasets. At 312, the control system trains the plurality of DNNs using the plurality of training datasets, respectively. At 316, the control system receives input data for the autonomous driving feature captured by the sensor device 120 and/or 124. At 320, the control system determines a plurality of outputs for the autonomous driving feature using the plurality of trained DNNs and the input data. At 324, the control system determines a best output for the autonomous driving feature using the plurality of outputs (e.g., via a voting scheme). In some implementations, determining the best output could further comprise determining a degradation state when the plurality of outputs continue to not differ by more than a threshold (i.e., are too close or agree) for a period of time and, in response to determining the degradation state, at least one of set a fault and adjust or limit operation of the autonomous driving feature. This could include, for example only, requesting or forcing driver overtake or intervention. The method 300 then ends or returns to 304 for one or more additional cycles.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture. It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An autonomous driving system for a vehicle, the autonomous driving system comprising:
a sensor device configured to capture input data for an autonomous driving feature; and
a control system configured to:
obtain a training dataset for training a plurality of deep neural networks (DNNs) for the autonomous driving feature;
sub-sample the training dataset to obtain a plurality of training datasets comprising the training dataset and one or more sub-sampled training datasets each having a different resolution than a remainder of the plurality of training datasets;
train the plurality of DNNs using the plurality of training datasets, respectively;
determine, using the plurality of trained DNNs and the input data, a plurality of outputs for the autonomous driving feature; and
determine, using the plurality of outputs, a best output for the autonomous driving feature.

2. The autonomous driving system of claim 1, wherein control system is configured to sub-sample the training dataset using sequential leader clustering.

3. The autonomous driving system of claim 2, wherein the sequential lead clustering comprises, for each sub-sampled training dataset:
determining a different clustering threshold value;
for each sample of the training dataset, determining a distance between the sample and remainder of the samples of the training dataset; and
removing any of the plurality of samples of the training dataset that have a distance less than the clustering threshold value indicative of a match with another particular sample of the training dataset to generate the sub-sampled training dataset.

4. The autonomous driving system of claim 1, wherein the control system is configured to train the plurality of DNNs using a different dropout rate for each of the plurality of DNNs.

5. The autonomous driving system of claim 4, wherein the control system is further configured to:
determine a degradation state when the plurality of outputs continue to not differ by more than a threshold for a period of time; and
in response to determining the degradation state, at least one of set a fault and adjust or limit operation of the autonomous driving feature.

6. The autonomous driving system of claim 1, wherein the control system is configured to determine the best output for the autonomous driving feature using a voting scheme.

7. The autonomous driving system of claim 1, wherein the autonomous driving feature is object detection and tracking, wherein control system is configured to sub-sample the training dataset using sequential leader clustering, and wherein the sequential lead clustering comprises, for each sub-sampled training dataset:
(1) selecting a different clustering threshold (T);
(2) initializing a codebook (R) by randomly selecting a sample ($x_i$) from the training dataset ($\Omega$);
(3) for each sample $x_i$ in $\Omega$, compute a distance ($d_{ij}$) between $x_i$ and every sample $x_j$ in R;
(4) compute a minimum distance of $d_{ij}$ ($d_{ij}$min), the distance between $x_i$ and a closest sample in R;
(5) when $d_{ij}$min is smaller than T, the sample is not added to R;
(6) when $d_{ij}$min is larger than T, the sample is added into the R; and
(7) output R as the sub-sampled training dataset.

8. The autonomous driving feature of claim 1, wherein the sensor device is a camera system configured to capture images of an area external to the vehicle.

9. The autonomous driving system of claim 1, wherein the sensor device is a light detection and ranging (LIDAR) system configured to capture LIDAR point cloud data for an area external to the vehicle.

10. A method for training multiple resolution deep neural networks (DNNs) for vehicle autonomous driving, the method comprising:
obtaining, by a control system, a training dataset for training a plurality of DNNs for an autonomous driving feature of the vehicle;
sub-sampling, by the control system, the training dataset to obtain a plurality of training datasets comprising the training dataset and one or more sub-sampled datasets each having a different resolution than a remainder of the plurality of training datasets;
training, by the control system, the plurality of DNNs using the plurality of training datasets, respectively;
determining, by the control system, a plurality of outputs for the autonomous driving feature using the plurality of trained DNNs and the input data;
receiving, by the control system, input data for the autonomous driving feature captured by a sensor device; and
determining, by the control system, a best output for the autonomous driving feature using the plurality of outputs.

11. The method of claim 10, wherein the sub-sampling of the training dataset comprises using sequential leader clustering.

12. The method of claim 11, wherein the sequential lead clustering comprises, for each sub-sampled training dataset:
determining, by the control system, a different clustering threshold value;
for each sample of the training dataset, determining, by the control system, a distance between the sample and remainder of the samples of the training dataset; and
removing, by the control system, any of the plurality of samples of the training dataset that have a distance less than the clustering threshold value indicative of a match with another particular sample of the training dataset to generate the sub-sampled training dataset.

13. The method of claim 10, wherein training the plurality of DNNs comprises using a different dropout rate for each of the plurality of DNNs.

14. The method of claim 10, wherein the determining of the best output for the autonomous driving feature comprises using a voting scheme.

15. The method of claim 14, further comprising:
determining, by the control system, a degradation state when the plurality of outputs continue to not differ by more than a threshold for a period of time; and
in response to determining the degradation state, at least one of, by the control system, setting a fault and adjusting or limiting operation of the autonomous driving feature.

16. The method of claim 10, wherein the autonomous driving feature is object detection and tracking, wherein the sub-sampling of the training dataset comprises using sequential leader clustering, and wherein the sequential lead clustering comprises, for each sub-sampled training dataset:

(1) selecting a different clustering threshold (T);
(2) initializing a codebook (R) by randomly selecting a sample ($x_i$) from the training dataset ($\Omega$);
(3) for each sample $x_i$ in $\Omega$, compute a distance ($d_{ij}$) between $x_i$ and every sample $x_j$ in R;
(4) compute a minimum distance of $d_{ij}$ ($d_{ij}$min), the distance between $x_i$ and a closest sample in R;
(5) when $d_{ij}$min is smaller than T, the sample is not added to R;
(6) when $d_{ij}$min is larger than T, the sample is added into the R; and
(7) output R as the sub-sampled training dataset.

17. The method of claim 10, wherein the sensor device is a camera system configured to capture images of an area external to the vehicle.

18. The method of claim 10, wherein the sensor device is a light detection and ranging (LIDAR) system configured to capture LIDAR point cloud data for an area external to the vehicle.

* * * * *